Aug. 4, 1970

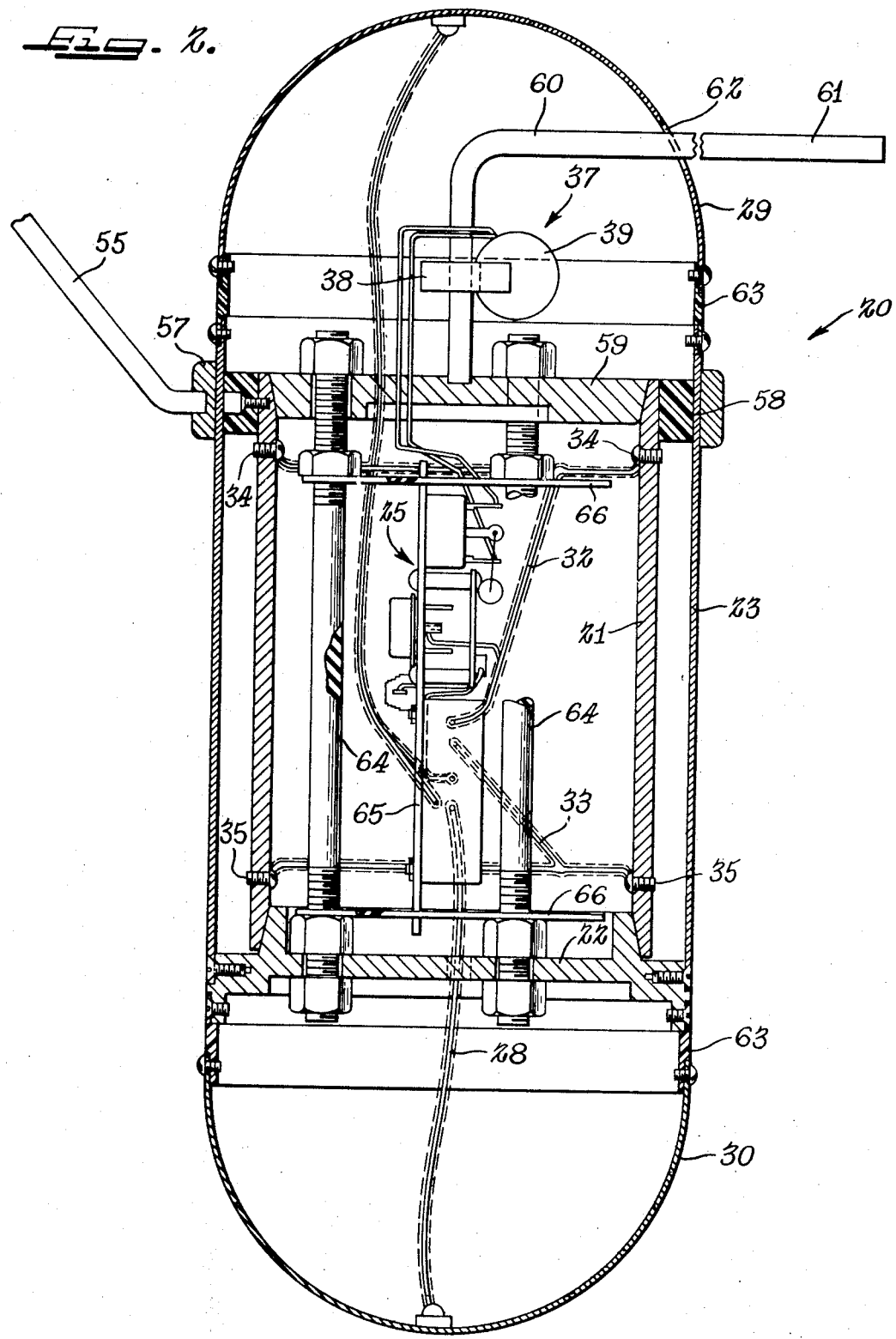

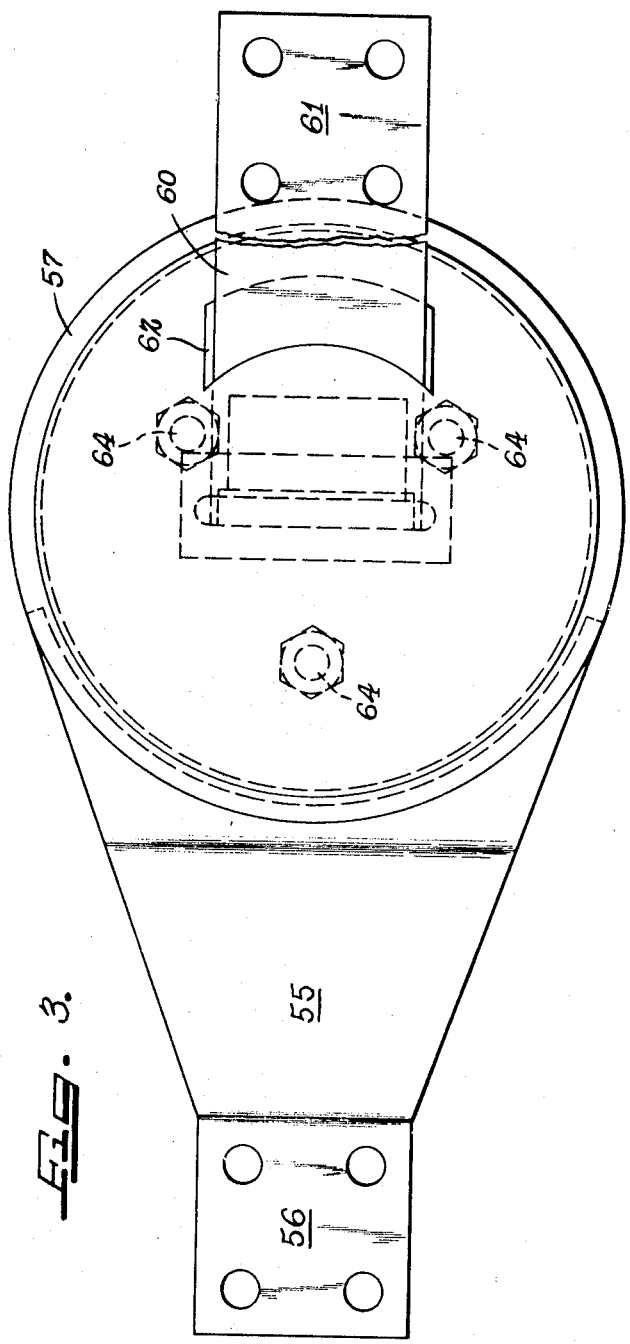

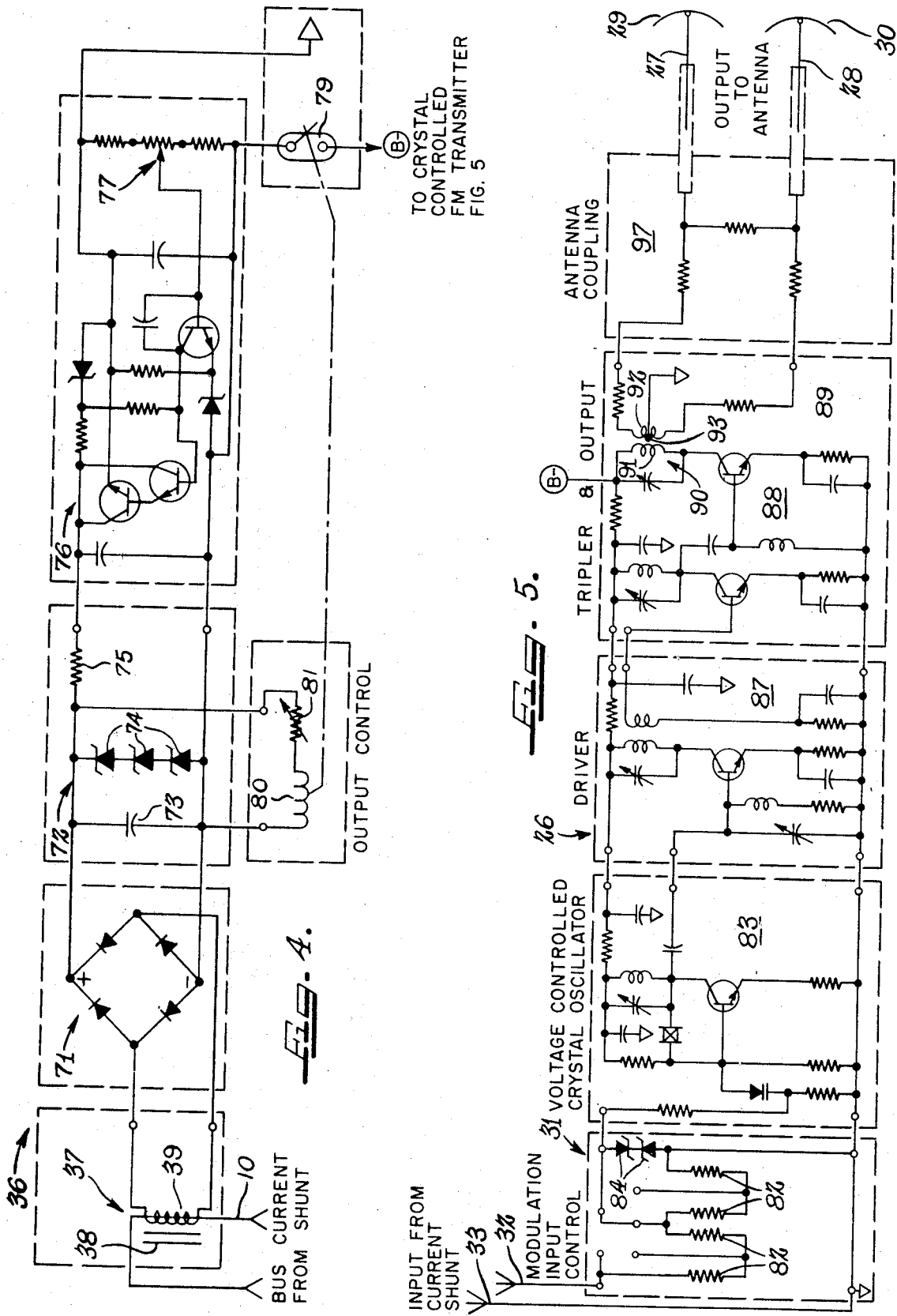

R. H. HARNER 3,522,515

Figure 6:
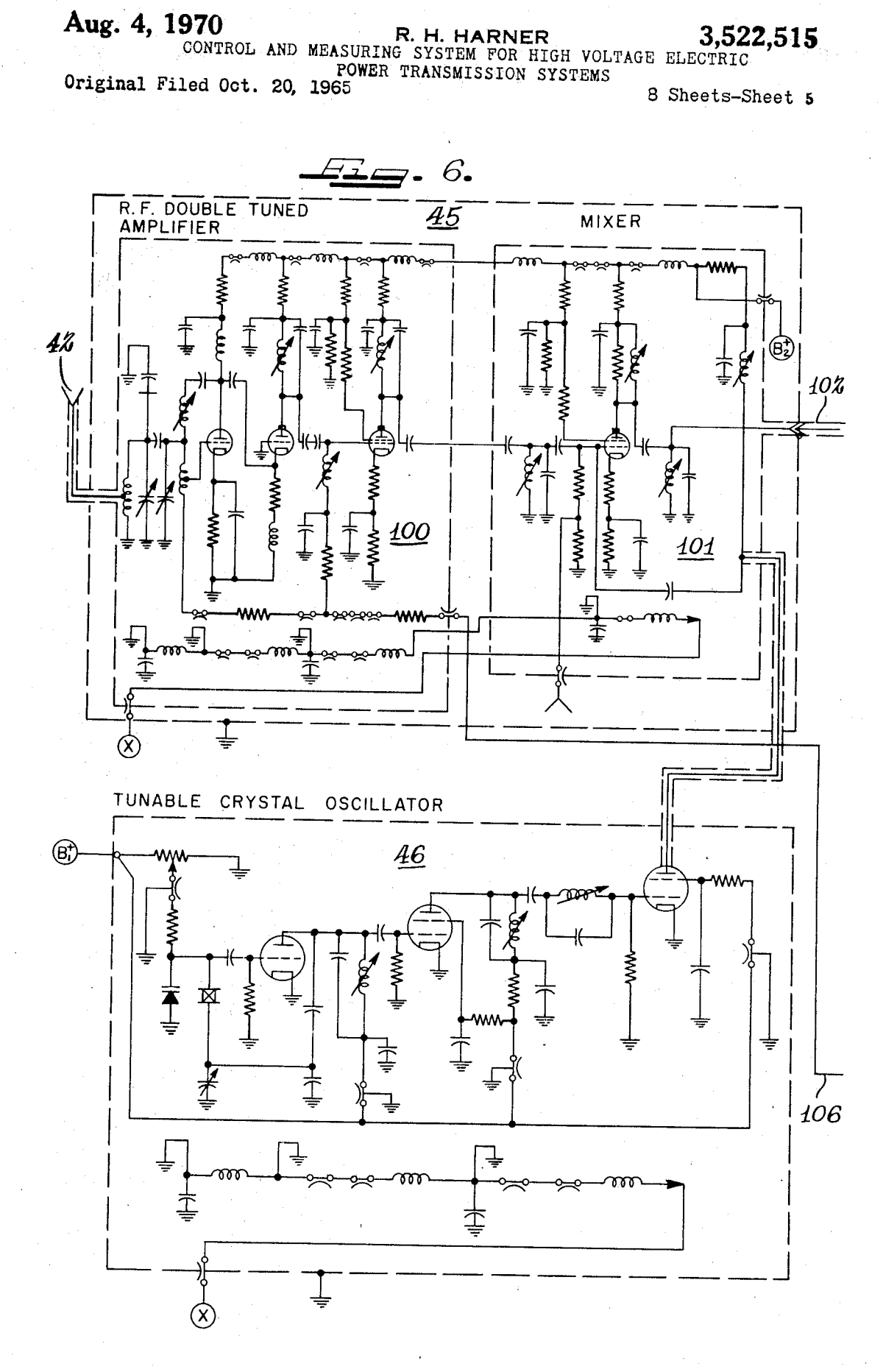

CONTROL AND MEASURING SYSTEM FOR HIGH VOLTAGE ELECTRIC
POWER TRANSMISSION SYSTEMS

Original Filed Oct. 20, 1965

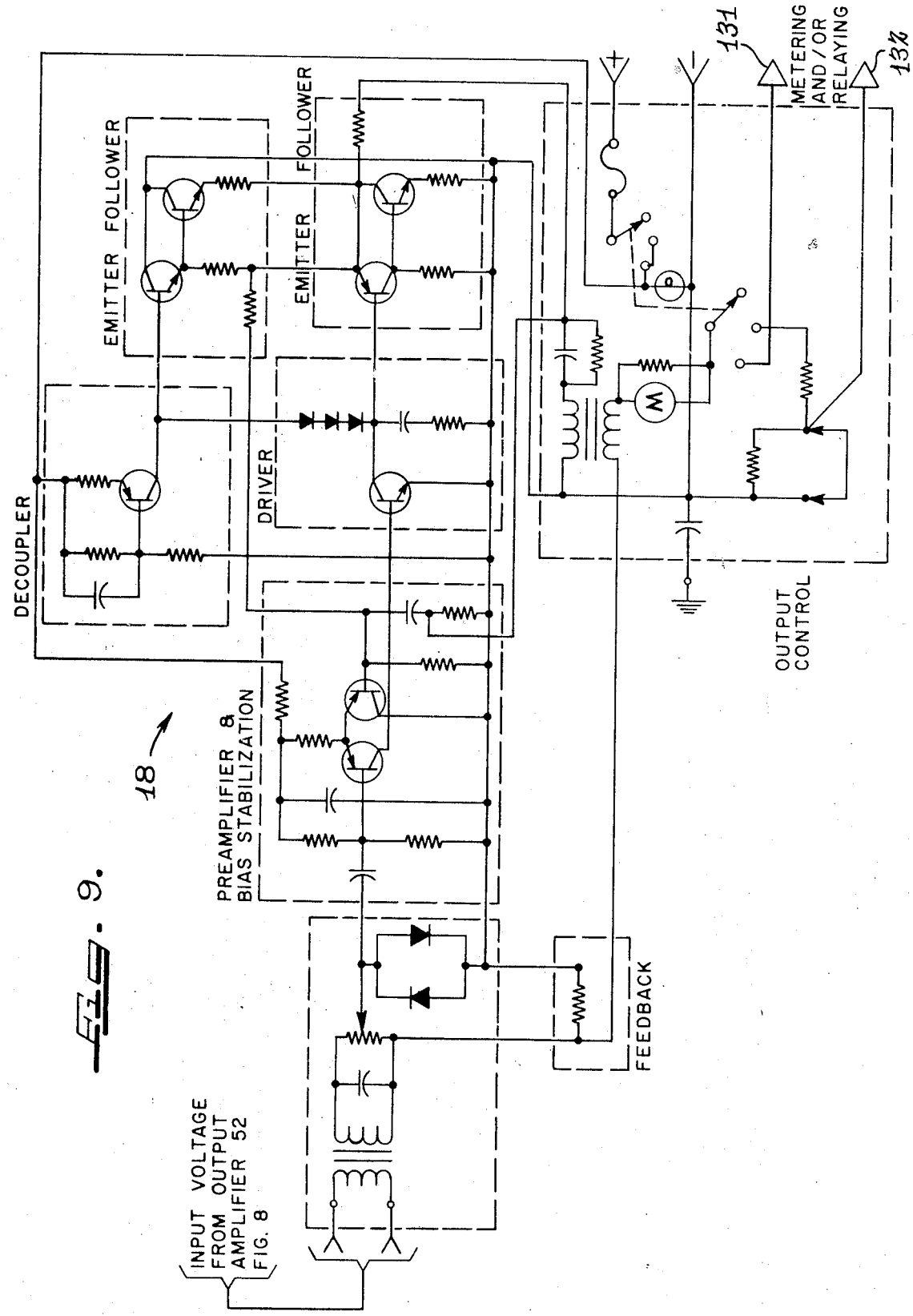

United States Patent Office 3,522,515
Patented Aug. 4, 1970

3,522,515
CONTROL AND MEASURING SYSTEM FOR HIGH VOLTAGE ELECTRIC POWER TRANSMISSION SYSTEMS
Robert H. Harner, Park Ridge, Ill., assignor to S & C Electric Company, Chicago, Ill., a corporation of Delaware
Original application Oct. 20, 1965, Ser. No. 498,696, now Patent No. 3,460,042, dated Aug. 5, 1969. Divided and this application June 14, 1968, Ser. No. 751,326
Int. Cl. H02m *1/18, 7/20*
U.S. Cl. 321—14                                       2 Claims

ABSTRACT OF THE DISCLOSURE

Power supply for radio transmitter on high voltage conductor includes a magnetic core linking the conductor and having high induction at low current and saturable at low flux density, a secondary winding linking the core for energizing a bridge rectifier that energizes a voltage regulator to provide a constant direct voltage. A voltage limiter between the rectifier and the regulator prevents high voltage being applied to the regulator. A filter between the rectifier and limiter eliminates ripple in the direct current supplied to the regulator.

---

This application is a division of application Ser. No. 498,696, filed Oct. 20, 1965, now Pat. No. 3,460,042, issued Aug. 5, 1969.

This invention relates, generally, to remote current measuring and circuit breaker control in connection with high voltage alternating and direct current electric power transmission systems operating at voltages ranging from 138 kv. to 750 kv. but it is not limited to this voltage range. It constitutes an improvement over the system disclosed in application Ser. No. 279,376, filed May 10, 1963, now abandoned.

Among the objects of this invention are: To provide in a new and improved manner for transmitting a signal corresponding to the magnitude of a variable at the potential of a high voltage conductor and for receiving the signal at ground potential; to employ for this purpose a radio transmiter operating at the potential of the conductor and a radio receiver operating substantially at ground potential; to provide such a radio transmitter that is free from the effects of electromagnetic and electrostatic fields in the ambient of the high voltage conductor and adjacent high voltage conductors, and is free from interference by man made and natural causes; to consrtuct the radio transmitter such that it does not generate corona; to operatively connect the receiver to the means intended to be responsive to the signal received thereby from the transmitter only when such a signal is being received; to employ a frequency modulated transmitter and receiver combination for making the measurement and transmitting and receiving it with the receiver being operatively connected to signal responsive means only when the transmitter is operating substantially at center frequency; to provide a receiver capable of operating at low field strength and in a noisy environment that usually exists in a typical electric power station; to transmit and receive the signal corresponding to current flow in the conductor; to employ for the frequency modulated transmitter a voltage controlled crystal oscillator the frequency of which is varied as a function of the magnitude of the current flow in the conductor; to arrange a crystal controlled frequency modulated receiver to generate a voltage that is instantaneously proportional to the current flow in the conductor; to multiply the frequency generated by the crystal oscillator of the transmitter and to radiate it as frequency modulated by the modulating voltage which varies according to the current flow in the conductor; to modulate a radio transmitter operating at the potential of a high voltage electric power transmission line or conductor by a voltage derived therefrom due to line current flow through a resistive tubular conductor, the voltage drop across the conductor varying as a function of such current flow; to position the radio transmitter within such a resistive tubular conductor; to combine with the resistive tubular conductor metallic end cap means which function therewith to electrostatically and electromagnetically shield the transmitter and minimize the emission of corona at the potential of the line; to enclose the resistive tubular conductor by an outer coaxial and coextensive high conductivity tubular conductor connected in series therewith; to interconnect the radio transmitter and the end cap means so that the latter function as the antenna for the former; to obtain the modulating voltage for the transmitter from a non-inductive shunt; to limit the signal input to the transmitter to a predetermined value regardless of the magnitude of the variable, such as current flow, above a predetermined value; to energize the frequency modulated transmitter by voltage derived from current flow in the conductor only when that voltage is at a predetermined value; to arrange for a power supply at constant voltage for the transmitter from the conductor in which the current flow may vary from 50 to 100,000 amperes; to regulate this voltage to maintain it substantially at this predetermined value to maintain the operation of the frequency modulated transmitter in response to predetermined current flow in the conductor, thereby eliminating need for batteries; and to provide a feedback transconductance amplifier, to drive a particular meter, relay or other responsive device, capable of causing a current flow to a burden or load circuit which current flow is independent of the impedance of the burden or load circuit over a wide range of impedance.

In the drawings:

FIG. 2 is a vertical sectional view of a coaxial shunt that is connected in the high voltage transmission line.

FIG. 3 is a top plan view of the coaxial shunt shown in FIG. 2.

FIG. 4 shows the circuit connections for the power supply circuit for the frequency modulated transmitter located in the coaxial shunt.

FIG. 5 shows the circuit connections for the frequency modulated transmitter located in the coaxial shunt.

Figure 7:
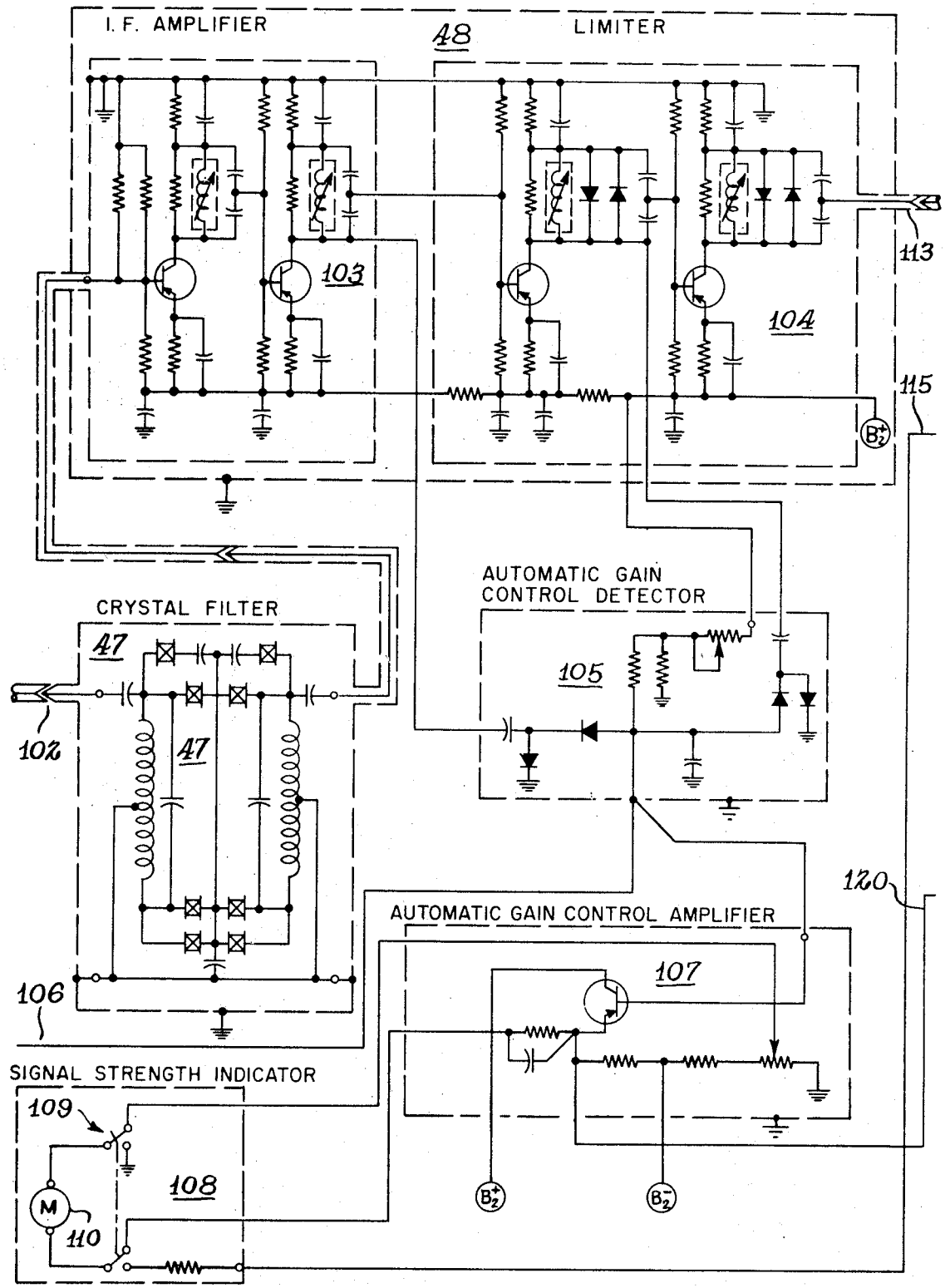
Figure 8:
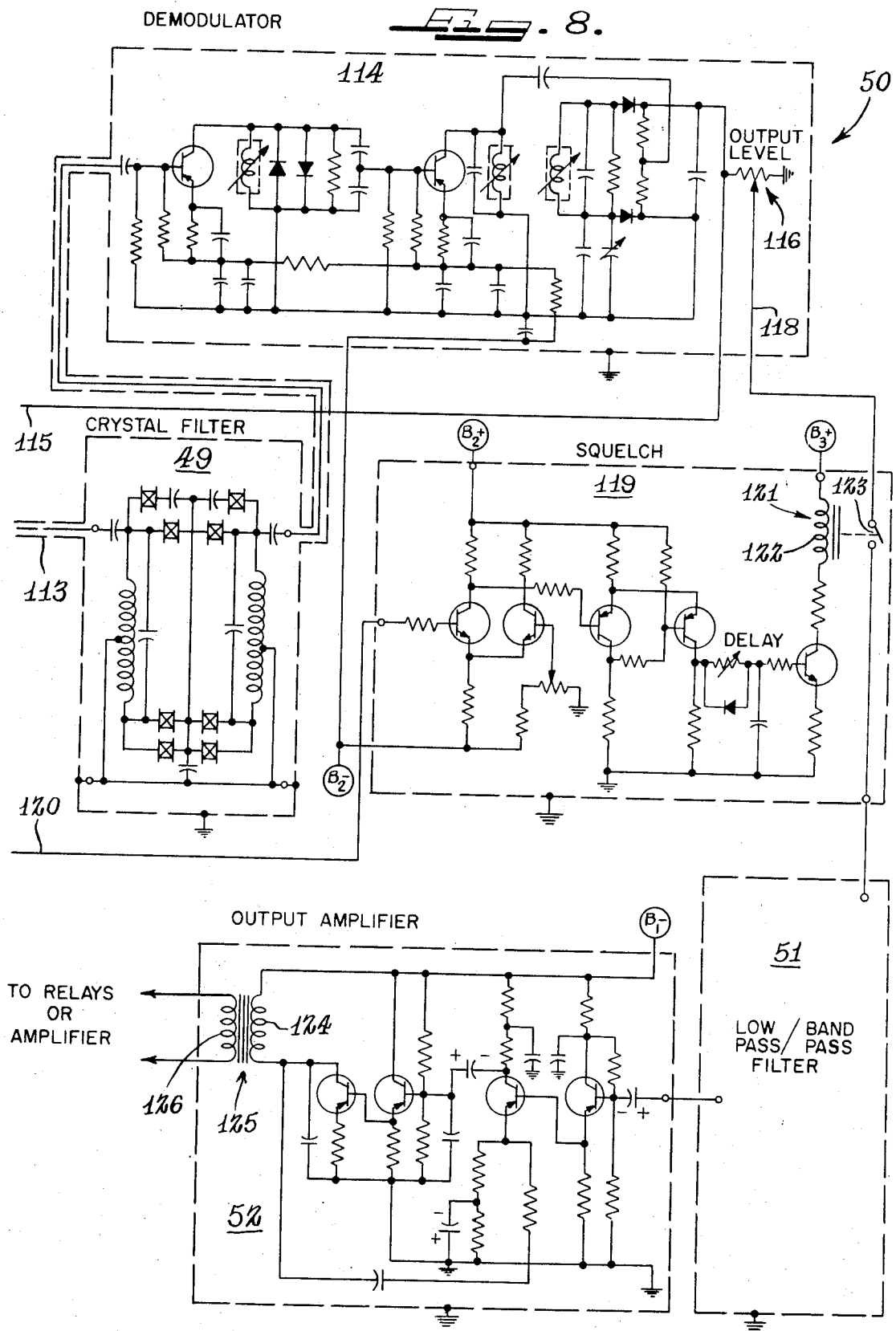

FIGS. 6, 7 and 8, placed in side-by-side relation in the order named, show the circuit connections for the frequency modulation receiver.

FIG. 9 shows the circuit connections for the transconductance feedback amplifier.

Figure 1:
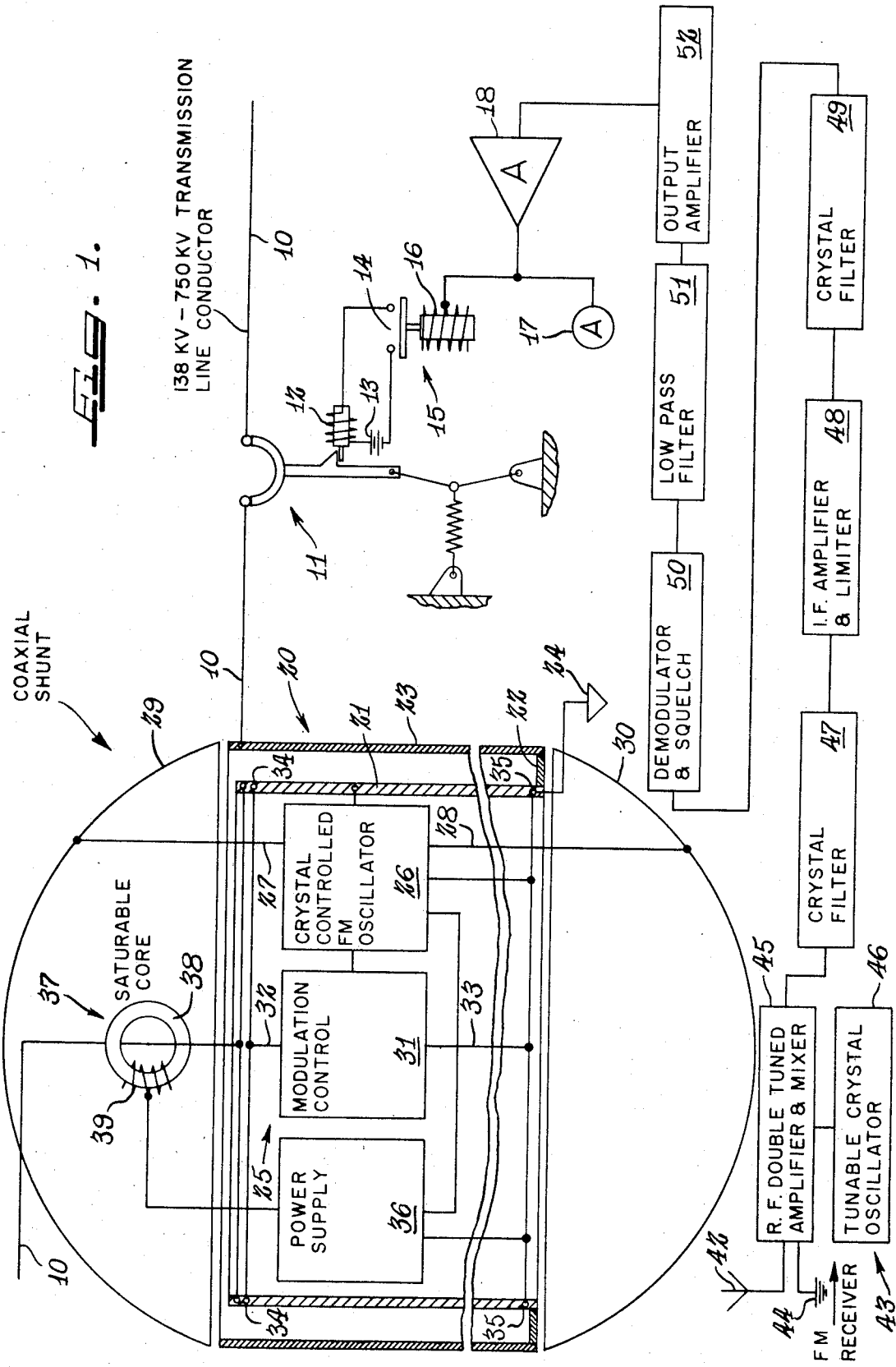
FIG. 1 shows diagrammatically a circuit breaker control and current measuring system for high voltage electric power transmission systems embodying this invention, it being understood that duplicate equipment is provided for each of the other phases of a polyphase alternating current transmission system.

Referring to FIG. 1, the reference character 10 designates a high voltage electric power transmission line or conductor which is insulated by suitable insulation from ground. It is arranged to operate at voltages ranging upwardly to 750 kv. or higher. The conductor 10 comprises one phase of a polyphase alternating current system. Where direct current is used, it comprises the ungrounded conductor.

It is desirable to provide for measuring the current flow in the conductor 10 for metering purposes and also for controlling the operation of a circuit breaker, such as the circuit interrupter indicated, generally, at 11 the contacts of which are connected in the conductor 10 for completing the circuit therethrough. The circuit interrupter 11 can be of conventional construction. The tripping arrangement for the circuit interrupter 11 is illustrated diagrammatically. It includes a trip coil 12 that is arranged to be energized from a suitable source, such as a battery 13 on closure of contacts 14 of an overcurrent relay 15. The relay 15 may be a conventional inverse time current relay that is provided with an operating winding 16. A static relay can be used. Also provision can be made for reclosing the circuit interrupter 11 subsequent to operating of the relay 15 for tripping it.

It is desirable to provide for measuring the current flow in the conductor 10 and for this purpose a current responsive device indicated at 17 is employed. The current responsive device 17 may be an ammeter, a current element of a wattmeter, the current element of a watthour meter, the current element of a power factor meter, a recording oscillograph, etc.

Ordinarily a number of windings 16 and current responsive devices 17 are connected for energization in series circuit relation. The impedance of these circuits may vary depending upon the operating characteristics of the particular devices. While it is desirable that provision be made for operating them in accordance with or on predetermined current flow, in view of the varying impedance of the respective circuits, it is desirable that provision be made for maintaining at a constant value the measured current flow in such manner that it is independent of the varying impedance. For this purpose there is provided an amplifier that is indicated, generally, at 18. This may be a transconductance feedback amplifier. Other signal conditioning devices can be employed also. For voltage responsive devices the output from the receiver, to be described, can be used directly or amplified to appear as a voltage source.

For measuring the current flow in the conductor 10 there is provided a coaxial shunt that is indicated, generally, at 20. It includes an inner tubular conductor 21 of an appropriate metal which forms a resistive section for a purpose to be described. The inner tubular conductor 21 is connected by a lower terminal plate 22 to an outer tubular conductor 23 that is coaxially related thereto and coextensive therewith and is formed preferably of a high conductivity material. A floating ground connection to the coaxial shunt 20 is indicated at 24.

Within the coaxial shunt 20 there is located a frequency modulated radio transmitter which is indicated, generally, at 25. It includes a crystal controlled frequency modulated oscillator 26 which is connected by coaxial conductors 27 and 28 to metallic end caps 29 and 30 located at the ends of the outer tubular conductor 23. The metallic end caps 29 and 30 provide the antenna for the transmitter 25. They are of such size and shape as to resonate at the frequency of the crystal controlled frequency modulated oscillator 26. In addition the metallic end caps 29 and 30 together with the inner and outer tubular conductors 21 and 23 effectively shield the radio transmitter 25 and provide a configuration from which the emission of corona at the potential of the conductor 10 is minimized. The construction of the coaxial shunt 20 is such that it not only minimzes corona emission but also it shields the transmitter 25 from the effects of the relatively strong electromagnetic field generated by high or short circuit current flow in the conductor 10. The net magnetic field within the inner tubular conductor 21 is practically zero for any current flow in conductor 10.

The radio transmitter 25 includes a modulation control 31 which is connected by conductors 32 and 33 to spaced points 34 and 35 along the inner tubular conductor 21 between which a voltage drop appears that is a linear function of the magnitude of the current flow in the conductor 10. The modulation control 31 provides selectable or variable modulation sensitivities to, in essence, change the transformation ratio of the system at any level over the dynamic range of the system such as 50 to 10,000 amperes; 200 to 40,000 amperes, 400 to 80,000 amperes, etc. Also the modulation control 31 makes possible limitation of the maximum frequency deviation of the system to various levels such as not to exceed the band pass of the receiver. Instead of a linear relationship between bus current and frequency deviation being used, a logarithmic function can be employed to increase the effective range.

For energizing the radio transmitter 25 a power supply 36 is employed for energization as the result of current flow in the conductor 10. Other sources of energy can be employed such as a battery, solar cells, etc., particularly when flow of direct current in the conductor 10 is to be measured and a corresponding signal transmitted.

In accordance with this embodiment of the invention the power supply 36 is arranged to limit the voltage applied to the radio transmitter 25. The power supply 36 is connected for energization to the conductor 10 by a transformer that is indicated, generally at 37 and located within the metallic end cap 29. If desired, it can be located exteriorly to the end cap 29. The transformer 37 employs the conductor 10 as a single turn primary winding. The conductor 10 extends through a saturable magnetic core 38 for the purpose of limiting the induction of current in a secondary winding 39 on the core 38. The saturable core 38 is employed since it is likely that the conductor 10 will have a relatively high current flow therein greatly in excess of normal load current flow. Such excess current flow takes place under fault conditions and, except for the saturable characteristic of the core 38 and the following limiter, would induce an unusually high voltage in the secondary winding 39. The core 38 also has relatively high induction at low levels of current flow in conductor 10, so that an adequate voltage and power output are available at low current flow in the conductor 10.

Since the frequency at which the frequency modulated transmitter 25 functions is affected by the voltage from the power supply 36 there is provided, as described hereinafter, a voltage responsive device and regulator in the power supply 36. The device energizes the transmitter only upon the application of an adequate voltage. This voltage is such that the frequency modulated oscillator 26 will function substantially at its center frequency when turned on and thus will not transmit an improperly modulated carrier. Provision is made for turning on the power supply 36 to energize the oscillator 26 only when a properly filtered and regulated voltage is available for this purpose. Current flow in conductor 10 must be above a certain threshold for this to happen. A supply voltage with a high ripple would be undesirable since it would appear as effective modulation of the carrier.

The frequency modulated signal radiated from the antenna formed by the end caps 29 and 30 is picked up by an antenna 42 of a frequency modulation receiver that is indicated, generally, at 43 and also is indicated as being grounded at 44. Since there is no direct connection between the conductor 10 or any part associated therewith and the receiver 43, it is possible to take advantage of the insulation normally provided for the conductor 10 and it is not necessary to provide any other insulation for the transmitter 25 or receiver 43 which, as pointed out, is arranged and adapted to operate at ground potential. The system functions entirely independently of the potential of the conductor 10 with respect to ground or other conductors. Thus, it may be applied to a power system operating at any voltage. The circuit details of the receiver 43 will be set forth hereinafter. For present purposes reference is made to the diagrammatic showing in FIG. 1. The incoming signal from the antenna 42 is fed to a radio frequency, double turned amplifier and mixer 45 with which there is provided a tunable crystal oscillator 46. The output of the crystal oscillator 46 beats with the received frequency modulated signal in the mixer to provide an intermediate frequency which is applied to a crystal filter 47 for removing, in part, extraneous frequencies consisting of interfering transmissions, internally generated receiver noise, and impulse and atmospheric noise. The output of the crystal filter 47 is applied to an intermediate frequency amplifier and limiter 48. Another crystal filter 49 is employed between the intermediate frequency amplifier and limiter 48 and the demodulator and squelch 50 for the purpose of further excluding extraneous frequencies and noise. The output of the demodulator and squelch 50 is a voltage that is instantaneously proportional to the current flow in the conductor 10. This voltage is applied to a low pass filter 51 for further removing extraneous signals and then is amplified by output amplifier 52. While the output of the receiver 43 can be employed for metering and relaying purposes, the signal is relatively weak. Accordingly, another amplifier 18, for example a transconductance feedback amplifier, can be employed not only for amplifying the voltage which varies according to the current flow in the conductor 10 but also to accommodate load circuits or burdens having varying impedances but requiring for their proper operation the flow of predetermined current. A voltage amplifier can be used in connection with the output of amplifier 52 to drive voltage dependent loads.

FIGS. 2 and 3 show the details of construction of the coaxial shunt 20. The terminal 55, preferably of a high conductivity material, is employed having a terminal pad 56 to facilitate connection in the conductor 10. The other end of the terminal 55 is suitably connected to a collector ring 57 that is secured to the upper end of the outer tubular conductor 23 for evenly distributing current into it. An insulating ring 58 is interposed between the upper ends of the inner and outer tubular conductors 21 and 23 to maintain them in predetermined coaxial spaced relation. An upper terminal plate 59 of good conducting material is connected to the upper end of the inner tubular conductor 21 and it is connected by a terminal 60, preferably a high conductivity material, which has a terminal pad 61 to facilitate the connection to the conductor 10. The terminal 60 extends through a suitable opening 62 in the upper metallic end cap 29. Insulating rings 63 at the upper and lower ends of the outer tubular conductor 23 serve to insulate the end caps 29 and 30 therefrom. Insulating bolts extend through the lower terminal plate 22 and the upper terminal plate 59 and serve to hold them in spaced assembled relation and in good contact engagement with the upper and lower ends of the inner tubular conductor 21. A heat sink plate 65 is provided for mounting the radio transmitter 25 thereon. It is located between insulating support plates 66 which are carried by the tie bolts 64. By locating the radio transmitter 25 within the inner tubular conductor 21, it is electromagnetically and electrostatically shielded with respect to its own and adjacent high power and high voltage circuits.

FIG. 4 shows the circuit connections for the power supply 36. Here the conductor 10 is shown as the primary winding for the transformer 37 with the secondary winding 39 located on the saturable core 38. Typical load current rating of the conductor 10 ranges from 600 to 2,000 amperes. When the current flow is less than about 50 amperes there is no particular need for an output for relaying applications and many metering applications. Accordingly, the size of the core 38 and its characteristics were selected so that a regulated output voltage of about 12 volts is provided by the power supply 36 on flow of 50 amperes or more in the conductor 10. The core 38 is fabricated of a nickel-iron alloy which exhibits high permeability at very low magnetizing force, and saturates at a relatively low flux density. High flux density at low magnetizing force is necessary to produce adequate voltage and power output at low values of line current. A permeability of approximately 100,000 at a flux density of 2,000–4,000 gauss and a magnetizing force of .02–.04 oersted produces the desired result. Saturation of the core at a flux density of approximately 6,000–8,000 gauss effectively limits output voltage and power from the transformer secondary to a level within the power handling capability of the limiting and filtering circuits at line currents up to 100,000 amperes or more under fault conditions. Since the core is driven into extreme saturation the unfiltered and unregulated transformer secondary output is extremely distorted. Provision is made for rectifying, filtering and regulating the output of the secondary winding 39. For this purpose there is provided a full wave rectifier 71 of the bridge type. The output of the rectifier 71 is applied to a filter and limiter circuit 72 which includes a capacitor 73, series connected Zener diodes 74 and a regulating resistor 75. The Zener diodes 74 are arranged to break down on application thereto of a given voltage thereby together with the resistor 75 limiting the voltage that can be applied to the voltage regulator 76. The capacitance of the capacitor 73 in conjunction with the impedance of the secondary winding 39 provides a suitable RC time constant for the power supply 36 and the combination of the capacitor 73 and the Zener diodes 74 controls the ripple in the output from the rectifier 71 that is within the range of the regulator 76 to accommodate and remove. The voltage regulator 76 is arranged to have an extremely good regulation and low ripple output over the entire range of current flow likely to take place in the conductor 10. This is of extreme importance since the frequency of the crystal controlled frequency modulated transmitter 26 is dependent upon the voltage of its supply and can be maintained substantially at the desired center frequency only when the supply voltage is regulated to within the limits mentioned. As pointed out, by substantially eliminating the ripple voltage, a constant voltage is provided for energizing the oscillator 26 without applying extraneous modulation to the carrier frequency. This is the effect that could be obtained through the use of a battery source which is impractical under these circumstances due to inaccessability and problems in maintaining the battery fully charged.

The output voltage of the regulator 76 can be varied by a potentiometer 77. This adjustment provides for a variation in the output voltage of + or −10% and allows coarse tuning of the transmitted to receiver frequency.

As pointed out, it is desirable that the power supply 36 initiates the functioning of the crystal controlled frequency modulated transmitter 25 only when the energizing voltage therefor is at a predetermined value. Also it is necessary that transmission begin within a few milliseconds after initiation of current flow in the conductor 10. The transient response of the transformer 37 and associated elements of the power supply 36 is such that the required power for the oscillator 26 is available within a few milliseconds. In order to insure that the transmitter functions only under the proper operating conditions, normally open contacts 79 are provided in the output circuit from the voltage regulator 76. The contacts 79 form a part of a voltage responsive relay having an energizing winding 80 that is connected through a variable resistor 81 and across the terminals of the filter and limiter circuit 72. The voltage responsive relay employing the contacts 79 and winding 80 can be a sensitive, high speed, bounce-free switching device, such as a read switch. If desired, a solid state switch can be employed to perform the switching function which connects the output of the voltage regulator 76 to energize the crystal controlled frequency modulated transmitter 25 at the proper instant.

When the current flow in conductor 10 drops below the threshold value, the winding 80 is deenergized sufficiently to permit opening of contacts 79. Until they open, the voltage regulator 76 maintains the constant direct voltage to the oscillator 26, thereby holding it at the center frequency until the contacts 79 are opened.

FIG. 5 shows in detail the circuit connections employed for the modulation control 31 and the crystal controlled frequency modulated oscillator 26. It will be recalled that the conductors 32 and 33 are connected to spaced points 34 and 35 along the inner tubular conductor 21 where a voltage drop appears that is directly proportional to and in phase with the current flow in the conductor 10. Since the coaxial shunt assembly is substantially noninductive, this voltage drop is in phase with the current flow in the conductor 10. If that current flow is a direct current rather than an alternating current, then this voltage drop is a direct function of the magnitude of the current flow in the conductor 10. The input from the coaxial shunt 20 is applied over conductors 32 and 33 to modulate input control 31 which comprises a network of resistors 82 the connections to which can be varied to provide the desired voltage for application to a voltage controlled crystal oscillator 83. This voltage is limited by clipping Zener diodes 84 which are connected such that, regardless of the magnitude of the current flow in conductor 10, the voltage applied to the crystal oscillator 83 does not cause it to transmit a signal to the receiver 43 of such magnitude as to cause it to tend to operate beyond its pass band and thus provide an erroneous signal.

It will be understood that the frequency of the voltage controlled crystal oscillator 83 is a sub-harmonic of the center frequency of the crystal controlled frequency modulated transmitter 25 which is radiated to the antenna 42 of the receiver 43. The oscillator output frequency is varied as a function of the analog voltage applied thereto from the modulation input control 31 which varies according to the magnitude of the current flow in the conductor 10. Associated with the oscillator 83 is a driver 87 and a tripler 88 which multiplies the frequency generated by the oscillator 83 to provide the transmission frequency which is frequency modulated for example + or −100 kc. over the range of maximum current flow in the conductor 10. This band width should be relatively narrow with respect to the spacing of stations or interfering signals in the frequency bands being used. This makes the system of the present invention readily applicable with the center frequency of the transmitter being chosen to lie somewhere between the center frequencies of adjacent commercial frequency modulated broadcast stations when this frequency band is chosen. The frequency deviation of the crystal controlled frequency modulated transmitter 26 is proportional to current flow in conductor 10 to within at least + or −1% up to full modulation.

An output circuit 89 is associated with the tripler 88. It includes a coupling transformer 90 having a primary winding 91 energized from the tripler 88 and a secondary winding 92 having a center tap 93 which is grounded as indicated. The output of the secondary winding 92 is applied to an antenna coupling circuit 97 and thence by conductors 27 and 28 to the metallic end caps 29 and 30 which function as the antenna for the purpose of radiating the frequency modulated transmission signals. The output power of the transmitter 25 may be higher than required under some conditions and the antenna coupling circuit 97 is arranged to attenuate the signal. The secondary winding 92 offers a relatively high impedance to the carrier frequency from the oscillator 26 and a relatively low impedance to the normal power frequency of the conductor 10. Thus, the end caps 29 and 30 are maintained substantially at the same potential and at the potential of the conductor 10.

The construction of the voltage controlled crystal oscillator 26 is such that it is operating at center frequency within one millisecond after closure of contacts 79 and thereby energization from the power supply 36.

Other voltage analog signals can be fed into the modulation input control 31. For example, if a signal corresponding to the potential of the conductor 10 is to be transmitted, then an analog of this potential is applied to conductors 32 and 33. In a similar manner stress variations in the conductor 10 or vibration thereof can be converted to analog voltages and used to pull the oscillator 83. Also a subcarrier frequency can be modulated by the analog voltage of a variable and the corresponding signal used to modulate the carrier frequency of the transmitter 25.

FIGS. 6, 7 and 8 show the detailed circuit connections for the frequency modulated receiver 43. The receiver 43 is arranged for battery operation and crystal frequency control. It employs principally solid state devices and circuitry to provide maximum sensitivity, selectivity and minimum impulse noise disturbance. The high sensitivity is required since the available field strengths may be limited depending upon the frequency band selected. Accordingly, the receiver 43 is arranged to operate satisfactorily at a field strength of the order of 50 micro volts per meter. Employing the circuit connections disclosed herein a relatively low noise figure for the radio frequency tuner is obtained.

It is contemplated that the system of the present invention may operate on transmission frequencies adjacent to relatively strong commercial broadcast stations. Accordingly, the receiver 43 must have a high degree of selectivity in order to avoid interference with commercial stations and the reception of false signals. For this purpose the amplifier and mixer 43 includes a radio frequency double tuned amplifier 100. Associated with the amplifier 100 is the tunable crystal oscillator 46 which generates a frequency that is applied to a mixer 101 and beats with the frequency modulated signal from the amplifier 100 to generate an intermediate frequency signal which is carried by a coaxial conductor 102 to the crystal filter 47, FIG. 7. The crystal control in the receiver 43 is employed to provide a fixed frequency reference base. Thus the system is unlikely to drift as a result of temperature change as would a system solely using tuned LC circuits.

The crystal filter 47 is designed to provide high attenuation for frequencies outside its pass band while providing uniform response within the pass band with little insertion loss. Here the crystal filter 47 is a restricted band pass crystal filter which is based on the proximity of an interfering commercial frequency modulated broadcast station and its field strength. The compromise is made between a maximum band width required for good impulse noise performance and a relatively narrow band width for good selectivity. These considerations are of particular importance in areas having a high density of commercial frequency modulated broadcast stations and high ambient impulse noise in the form of corona and arcing. Further improvement in selectivity can be obtained by using vertical polarization for the transmitter 25 rather than horizontal polarization, depending upon the polarization of the adjacent commercial frequency modulated broadcast station or other interfering signal.

The output from the crystal filter 47 is applied to an intermediate frequency amplifier 103 which forms a part of the amplifier and limiter 48. Associated with the intermediate frequency amplifier 103 is a limiter 104 that is employed to remove the amplitude modulated component of the received signal. The amplifier and limiter 48 are provided with an automatic gain control detector 105 which connected by conductor 106 to the double tuned amplifier 100 shown in FIG. 6. The automatic gain control detector 105 also is connected to an automatic gain control amplifier 107 which has associated therewith a signal strength indicator 108. A switch 109 is employed in the indicator 108 for controlling the connection of an indicating meter 110 to the automatic gain control amplifier 107 for the purpose of occasionally determining the strength of the signal that is being received and for checking system operation. As shown in FIG. 8 a coaxial conductor 113 interconnects the limiter 104 with a second crystal filter 49 the function of which is to further remove noise frequencies generated in the intermediate frequency amplifier 103 and limiter 104 due to limiting action. The band pass of the crystal filter 49 must be lower than that of the crystal filter 47 and the filter center frequency must be symmetrical about the center frequency for good noise performance. The output of the crystal filter 49 is applied to a demodulator 114 which is connected by a conductor 115 to the tuning and signal strength indicator 108 shown in FIG. 7. The demodulator 114 is arranged to generate across a potentiometer 116 a voltage which corresponds instantaneously in magnitude and phase with the current flow in the conductor 10. The output level of the demodulator 114 as represented across the potentiometer 116 is applied over a conductor 118 for further amplifiication to be described. Response of the receiver 43 to the sudden sensing of a carrier signal, due to the transmitter 25 becoming operable when the current in conductor 10 or the bus current rises above the threshold level, is a critical part of the system. The squelch circuit design and receiver transient response must be such that no unwanted transients appear in the output of the receiver 43 due to the sudden appearance of a carrier signal. The receiver output must contain only those transients in the sensed bus current and not those generated in the receiver 43. The radio frequency amplifier tuned circuits 45, IF amplifier tuned circuits 48, demodulator circuits 50, and the filters must yield a balanced or zero output when no carrier is present and only ambient noise is being received. The output must also be balanced about zero with no DC offset when the carrier is suddenly received. These requirements necessitate careful adjustment and stability of all these components so that the noise balance and carrier frequency balance of the receiver 43 remain fixed.

It is desirable, when the current in conductor 10 increases so as to cross the 50 ampere threshold turn on level for the radio transmitter 25, that there be a slight time delay in the application of the voltage applied to the circuits to be controlled thereby in order to ensure that the crystal controlled frequency modulated transmitter 25 is operating substantially at the center frequency and that a reliable signal is obtained. For this purpose a squelch circuit 119 is employed. It is connected by conductor 120 to the automatic gain control amplifier 107. The squelch circuit 119 includes a relay that is indicated, generally, at 121 and has an operating winding 122 and normally open contacts 123. The contacts 123 are arranged to be closed a short time of the order of 1 to 8 milliseconds after appearance of a carrier signal. At the end of this time interval, under normal operating conditions, the frequency modulated transmitter 25 will be operating at its center frequency. The signal applied over conductor 118 is essentially a 60 cycle voltage signal where the current flow in the conductor 10 is a 60 cycle alternating current. However, the magnitude of this signal is relatively weak. Accordingly, it is amplified by the output amplifier 52 after passing through the low pass filter 51. The low pass filter 51 is applied where the noise output due to internally generated receiver noise and ambient station impulse noise are limited only by the RF circuits in the receiver 43. Noise pulses, therefore, retain most of this high frequency energy and allow more efficient filtering action by the low pass filter 51. The output amplifier 52 may have a relatively low upper cutoff frequency and tend to "spread" the noise pulses. Therefore, filtering before amplification is desirable. For relaying a low pass filter having minimum delay and phase shift is used. For metering applications, a narrow 60 cycle bandpass filter can be used to eliminate all noise components.

The output of the amplifier 52 is applied to a primary winding 124 of an output transformer 125 which has a secondary winding 126 that is connected to relays or the amplifier 18, FIG. 9, or to other burden as may be desired. The output amplifier 52 has a frequency response adequate to pass the direct current component of an asymmetrical fault current.

If the impedance of a current responsive burden to which the output of the receiver 43 is applied varies over a wide range and where a greater power output is required, the output from the output amplifier 52 can be applied to the transconductance feedback amplifier 18 shown in FIG. 9. As pointed out hereinbefore the feedback amplifier 18 at the output terminals 131 and 132 provides an output current that is proportional to the input voltage from the output amplifier 52 regardless of the impedance of the metering and/or relaying circuits within the limits of the design of the amplifier 18.

The power output of the transconductance feedback amplifier 18 is adequate to drive a variety of solid state relays or conventional indicating or recording instruments. It is inherently linear and stable due to its feedback design and connections over its entire operating range. Over a more limited range accuracy required for metering can be obtained. This performance is maintained over typical ambient temperature extremes.

While the transconductance feedback amplifier 18 is normally designed for a specific impedance range for the metering and/or relaying circuits, it operates essentially as a current transformer with respect to the short circuiting of its output terminals. Also, it can be open circuited without damage to the amplifier and connected equipment or personnel.

The amplifier 18 is provided with decoupling and isolating circuits which permit the output to be substantially independent of the power supply voltage. Supply voltage is provided by a battery, the output voltage of which is subject to the usual long term variations, transient disturbances, and charger ripple fluctuations. Typical slow or sudden changes in the voltage from the supply battery produce no change in output of the amplifier 18 due to these changes.

The transconductance amplifier 18, providing a current output, is used only when current responsive loads or output devices are used. When a voltage responsive device is used, a voltage source must be used. Output voltage must remain fixed as load impedance varies up to the rated power output of the amplifier. This requires a low dynamic output impedance which generally can be accomplished by strong, negative voltage feedback. Linearity, stability, accuracy, and power supply current requirements are similar to those for the transconductance amplifier 18.

What is claimed as new is:
1. Power supply means for a radio transmitter operating at the potential of a high voltage current carrying electric power transmission line conductor in which the current flow may vary over a relatively wide range comprising:
    (a) a core of magnetic material for linking said conductor and characterized by having high induction at relatively low line current and saturable at relatively low flux density,
    (b) a secondary winding linking said core into which an alternating voltage is induced on current flow in said conductor,
    (c) a bridge rectifier connected across said secondary winding,
    (d) voltage regulating means energized from said bridge rectifier to provide direct current at substantially constant voltage for energizing said transmitter,
    (e) voltage limiting means interposed between said bridge rectifier and said regulating means to prevent application to the latter of a voltage above a predetermined value by the former, and
    (f) filtering means interposed between said bridge rectifier and said regulating means to supply direct current to the latter substantially free of ripple.
2. The invention, as set forth in claim 1, wherein the core is fabricated of a nickel-iron alloy having a permeability of approximately 100,000 at a flux density of 2000–4000 gauss and a magnetizing force of 0.02–0.04 oersted and saturable at a flux density of approximately 6000–8000 gauss.

(References on following page)

References Cited

UNITED STATES PATENTS

| | | | |
|---|---|---|---|
| 3,063,001 | 11/1962 | White | 321—16 |
| 3,373,341 | 3/1968 | Wattson | 321—18 X |
| 3,375,434 | 3/1968 | Shapiro | 321—18 X |

FOREIGN PATENTS

| | | |
|---|---|---|
| 136,413 | 1961 | U.S.S.R. |
| 971,155 | 9/1964 | Great Britain. |

J D MILLER, Primary Examiner

W. H. BEHA, Jr., Assistant Examiner

U.S. Cl. X.R.

321—16, 18; 323—22; 325—185